(12) United States Patent
Burstyn et al.

(10) Patent No.: US 6,873,460 B1
(45) Date of Patent: Mar. 29, 2005

(54) RETRACTABLE REAR PROJECTION DISPLAY

(75) Inventors: Herschel Clement Burstyn, Lawrenceville, NJ (US); Perry Niel Yocom, Princeton, NJ (US); Leon Shapiro, Lawrenceville, NJ (US)

(73) Assignee: Sarnoff Corporation, Princeton, NJ (US)

( * ) Notice: Subject to any disclaimer, the term of this patent is extended or adjusted under 35 U.S.C. 154(b) by 315 days.

(21) Appl. No.: 09/671,526

(22) Filed: Sep. 27, 2000

Related U.S. Application Data

(63) Continuation-in-part of application No. 09/611,707, filed on Jul. 7, 2000, now Pat. No. 6,561,649.
(60) Provisional application No. 60/143,058, filed on Jul. 9, 1999, and provisional application No. 60/178,332, filed on Jan. 27, 2000.

(51) Int. Cl.[7] .................. G03B 21/56; G02B 27/24; G02B 27/22; G02B 26/08
(52) U.S. Cl. .................. 359/461; 359/471; 359/474; 359/477; 359/204
(58) Field of Search .................. 359/17, 201, 202, 359/204, 461, 462, 471, 474, 477

(56) References Cited

U.S. PATENT DOCUMENTS

| | | | |
|---|---|---|---|
| 3,975,095 A | 8/1976 | Minoura et al. .............. 353/69 |
| 4,323,301 A | * 4/1982 | Spector ...................... 359/443 |
| 4,394,681 A | 7/1983 | Rowe ......................... 348/788 |
| 4,944,656 A | 7/1990 | Feng et al. ................. 116/173 |
| 4,969,732 A | 11/1990 | Wright et al. ................ 353/77 |
| 5,019,807 A | 5/1991 | Stapleton et al. ........... 345/206 |
| 5,160,951 A | * 11/1992 | Lander ........................ 353/79 |
| 5,179,440 A | 1/1993 | Loban et al. ................ 348/383 |
| 5,274,406 A | 12/1993 | Tejima et al. ................ 353/70 |
| 5,333,072 A | 7/1994 | Willett .......................... 349/6 |
| 5,381,502 A | 1/1995 | Veligdan ..................... 385/115 |
| 5,422,691 A | 6/1995 | Ninomiya et al. ............. 353/69 |
| 5,455,882 A | 10/1995 | Veligdan ..................... 385/116 |
| 5,467,154 A | 11/1995 | Gale et al. .................. 353/119 |
| 5,499,067 A | 3/1996 | Shibazaki ..................... 359/99 |
| 5,521,658 A | 5/1996 | Donohoe ...................... 353/98 |
| 5,613,748 A | 3/1997 | Yoshida et al. ............... 353/74 |
| 5,629,790 A | 5/1997 | Neukermans et al. ....... 359/198 |
| 5,639,151 A | 6/1997 | McNelley et al. ............ 353/98 |
| 5,741,057 A | 4/1998 | Goldberg et al. ............. 353/74 |
| 5,833,339 A | 11/1998 | Sarayeddine ................. 353/20 |
| 5,879,067 A | 3/1999 | De Vaan ...................... 353/98 |
| 5,975,703 A | 11/1999 | Holman et al. ............... 353/20 |
| 5,995,268 A | 11/1999 | Shiraishi et al. ............ 359/204 |
| 6,002,826 A | 12/1999 | Veligdan ..................... 385/120 |
| 6,012,816 A | 1/2000 | Beiser ........................ 353/122 |
| 6,023,369 A | 2/2000 | Goto .......................... 359/443 |
| 6,046,847 A | 4/2000 | Takahashi ................... 359/457 |
| 6,052,226 A | 4/2000 | Takahashi ................... 359/457 |
| 6,061,178 A | 5/2000 | Park .......................... 359/457 |
| 6,181,386 B1 | 1/2001 | Knox .......................... 348/788 |

(Continued)

FOREIGN PATENT DOCUMENTS

| | | |
|---|---|---|
| EP | 0783133 | 12/1996 |
| EP | 0783133 | 7/1997 |
| EP | 0884898 | 12/1998 |
| WO | WO 99/46932 | 9/1999 |

*Primary Examiner*—Russell Adams
*Assistant Examiner*—Magda Cruz
(74) *Attorney, Agent, or Firm*—William J. Burke, Esq.

(57) ABSTRACT

A retractable screen system suitable for portable, hand held computing and communication units joins a number of optical sheets to form a rollable, extendible and retractable projection sheet. The resulting folded optical system provides a lightweight, portable unit. Telescoping arms allow the screen to be extended and stowed quickly and easily. High screen resolution is afforded by multiple mechanisms that scan concurrently. Beam indexing of the screen permits the precise alignment via feedback, and an embodiment fit for military, command and control applications.

17 Claims, 9 Drawing Sheets

U.S. PATENT DOCUMENTS

| | | | |
|---|---|---|---|
| 6,185,038 B1 | 2/2001 | Yamaguchi et al. | 359/457 |
| 6,211,932 B1 | 4/2001 | Iigahama et al. | 349/95 |
| 6,233,024 B1 | 5/2001 | Hiller et al. | 348/744 |
| 6,249,377 B1 * | 6/2001 | Takamoto et al. | 359/461 |
| 6,275,334 B1 | 8/2001 | Park | 359/449 |
| 6,318,862 B1 | 11/2001 | Sarayeddine | 353/20 |
| 6,375,327 B2 | 4/2002 | Holman et al. | 353/20 |
| 6,406,150 B1 * | 6/2002 | Burstyn | 353/69 |
| 6,466,369 B1 * | 10/2002 | Maddock | 359/460 |
| 6,511,186 B1 | 1/2003 | Burstyn et al. | 353/76 |

* cited by examiner

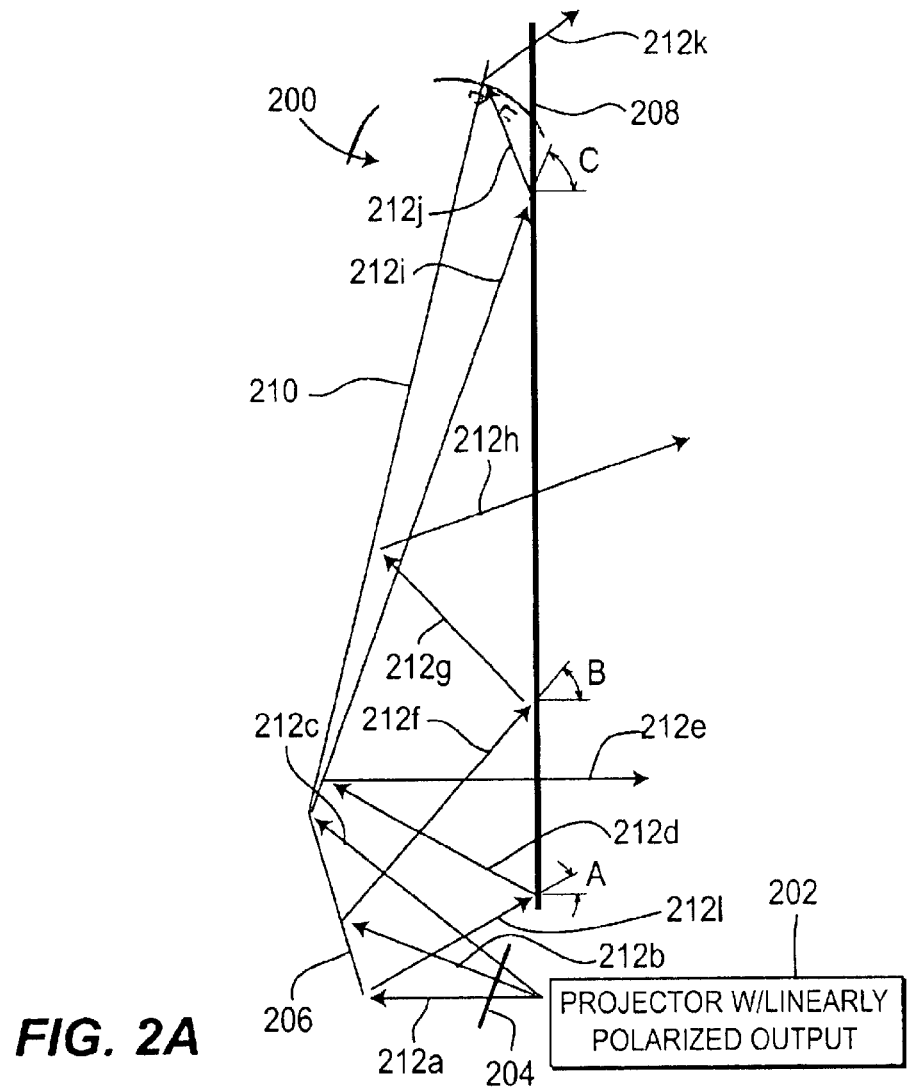
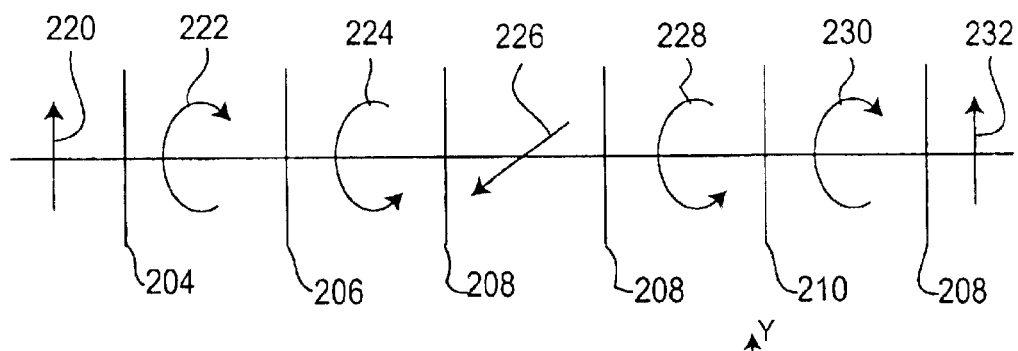
FIG. 2A
FIG. 2B

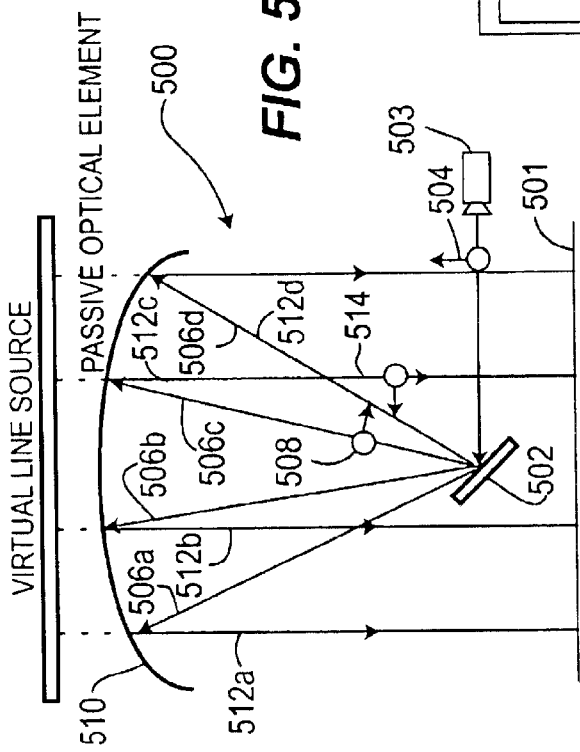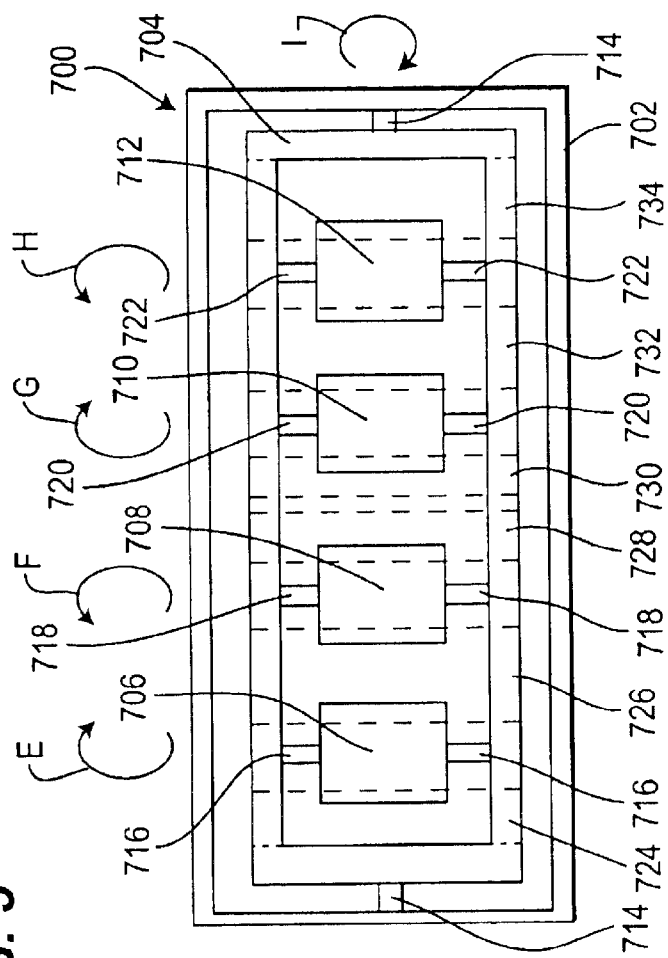

RETRACTABLE REAR PROJECTION DISPLAY

CROSS-REFERENCE TO RELATED APPLICATIONS

This application is a continuation in part of currently U.S. Non-Provisional application Ser. No. 09/611,707, entitled "Compact Rear Projection System Using Birefringent Optics" filed Jul. 7, 2000, now U.S. Pat. No. 6,561,649 which claims priority from U.S. Provisional Patent Application No. 60/143,058, entitled "Compact Rear Projection System Based upon a Curved Turning Mirror and Anamorphic Projection" filed Jul. 9, 1999, and from which the present application also claims priority. The present application, in addition, claims priority from the U.S. Provisional Patent Application No. 60/178,332, entitled "Collapsible Rear Projection Display" filed Jan. 27, 2000. All of these applications are incorporated herein by reference.

FIELD OF THE INVENTION

This invention relates to image projection systems, and more particularly to rear projection systems with retractable screens.

BACKGROUND

There has been a recent surge in the demand for hand held computing and communication devices, such as personal assistants and cellular telephones. Providing these devices with image projection capability requires small and lightweight projection systems. The screen for such a system should be designed for portability without sacrificing, despite its small dimensions, acceptable resolution. The screen, moreover, while small, should be larger in the deployed state than screens currently used in these portable devices. These displays generally provide an unacceptable viewing area for high resolution.

SUMMARY OF THE INVENTION

A rear-projection system according to the principles of the invention has a retractable rear-projection screen that is retractable into or extendible from a base of the host device. An example of a base is a rear-projection television or a hand-held device such as a cellular phone, personal assistant or a portable computer appliance, e.g., with wireless Internet access. A projector within the base projects light onto the rear of the screen when the screen is extended. The viewer views a resulting image on the front of the screen. The screen can be stowed into the base when the screen is not in use, so that the device is portable and easily stored.

BRIEF DESCRIPTION OF THE DRAWINGS

A more complete understanding of the invention can be obtained from the following description in conjunction with the drawings, in which:

FIGS. 2A and 2C, and 2B and 2D show, respectively, ray traces and corresponding polarization state diagrams exemplary of the invention;

FIG. 5 illustrates a scanning system according to the principles of the invention;

FIG. 6 shows a polarizing scanner according to the principles of the invention;

FIG. 7 illustrates a scanning system according to the principles of the invention;

DETAILED DESCRIPTION

Figure 1:
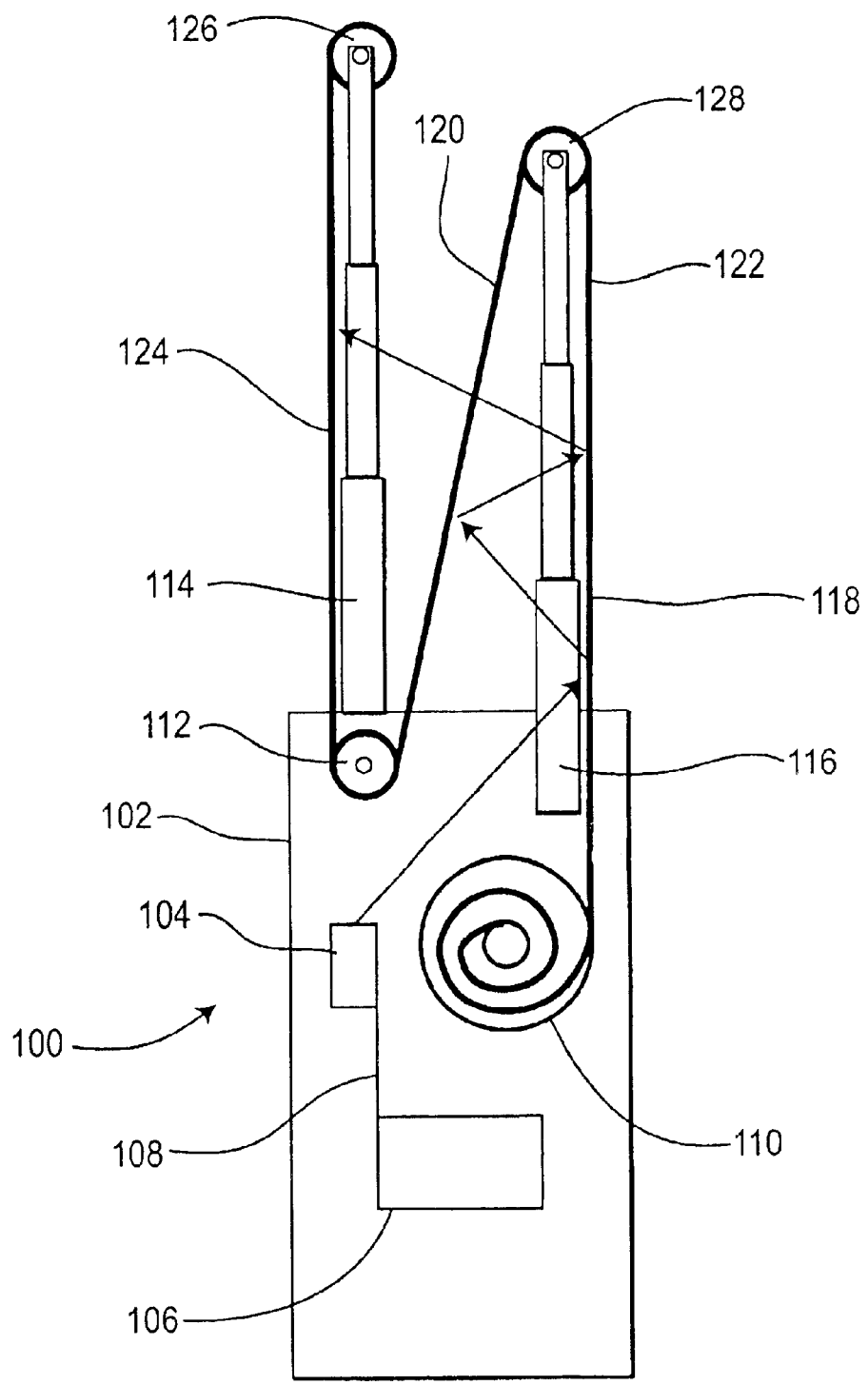
FIG. 1 shows a side view of a retractable screen system according to the principles of the invention.

A hand-held projection screen system 100 according to the principles of the invention is shown, in side view, by FIG. 1. The hand-held unit 100 includes a housing 102 that contains an image formation module 104, an image information memory 106, a bus 108, a take-up roller 110, an internal pulley 112, a front telescoping arm pair 114, a rear telescoping arm pair 116, and a projection sheet 118. The image formation module 104 and the image information memory 106 are located within the housing 102. The image formation module 104 comprises, for example, a scanner having a laser and a light modulator. The image information memory 106 contains information, such as pixel data, for forming an image. The memory 106 also includes means for reading from and, optionally, writing to the memory 106. The image formation module 104 reads information from the image information memory 106 via the bus 108. The information in the memory 106 may be generated internal to the unit 100 or communicated from outside the unit 100, as by an antenna.

Residing nearly fully within the housing 102 when stowed into a stowed position, and less fully within the housing 102 when extended into an deployed position, is the projection sheet 118. A front telescoping arm pair 114 and a rear telescoping arm pair 116 support the projection sheet 118. Because FIG. 1 is a side view, it shows one of the arms of the front telescoping arm pair 114 in extended position—the other arm of the pair is hidden from view behind the arm shown. The same holds for the rear telescoping arm pair 116—only one arm of the pair is shown in FIG. 1. A front pulley 126 joins the distal ends of the arms of the front telescoping arm pair 114 and is attached to an end of the projection sheet 118. The projection sheet 118 includes a first sheet 120, which joins a second sheet 122 and a third sheet 124 end-to-end to form a continuous film so that, in effect, the front telescoping arm pair 114 is attached to an end of the third sheet 124. When, as pictured in FIG. 1, the front telescoping arm pair 114 is extended, it, along with the front pulley 126, frames the third sheet 124. The third sheet 124 extends between the front telescoping arm pair 114, into the housing 102, and around the internal pulley 112. Also extending around the internal pulley 112 is the first sheet 120, which continuously joins the first sheet 124. The first sheet 120 extends out of the housing 102 at a tilted angle to roll around a rear pulley 128 that connects the distal ends of the rear telescoping arm pair 116. The rear pulley 128 and the rear telescoping arm pair 116 together frame the second sheet 122. The second sheet 122, at one of its ends, continuously joins the first sheet 120 and rolls around the rear pulley 128. At the opposite end, the second sheet rolls around the take-up roller 110 after entering the housing 102. The take-up roller 110 is biased, as by a spring, to take up the slack in the projection sheet 118. Collapsing the front telescoping arm pair 114 and the rear telescoping arm pair 116 causes the projection sheet 118 to roll around the internal pulley 112 and the rear pulley 128 onto the take-up roller 110, making the unit 100 easy to store or transport.

The three sheets that make up the projection sheet 118 have different optical characteristics. The first sheet 120 is a polarization-dependent reflector that selectively transmits and reflects light based on polarization state of the light. The second sheet 122 is a multi-layered laminated structure. When implemented as two layers, the internal layer is a quarter-wave retarder, which rotates the polarization state of the incident light by 90 degrees. The backing layer is a metallic mirror. A multi-layered design to reduce light leakage in the folded optics is discussed below. The third sheet 124 is also a laminated structure, having multiple layers that include a collimating, light-incident layer and a plastic layer that may include diffusers. Details of this folded optical configuration are provided below.

A folded circularly polarized system according to the principles of the invention provides for reduced cabinet depths in comparison to known projection systems, and is suited for the dimensions of a hand-held unit. Projected images traverse a folded light path such that light is incident on the transmission screen at a projection quality angle (for example, having a magnitude less than the Brewster angle). In one embodiment, a polarization-dependent reflector acts as a mirror in the optical path for light of a particular polarization state. After the polarization-dependent reflector reflects the projected light, the polarization state is manipulated to a transmissible polarization state. The projected image can then pass through the polarization-dependent reflector to the transmission screen and then to the viewing audience. Due to the geometry of the optical path, the light incident on the transmission screen is a projection quality incident angle.

FIG. 2A illustrates a ray trace 200 for a circularly polarized system exemplary of principles of the invention. The optical configuration includes an image projector 202, mirrors 206 and 210 and a transmission screen 208. The projection image rays 212(a–l) are shown as arrows on the ray trace 200. The projection system also includes a quarter-wave polarizer 204. In operation, the projector 202 projects an image in the direction of the turning mirror 206. The projected image is shown as rays 212(a–c) leaving the projector 202 in the direction of the mirror 206. The quarter-wave material 204 is interposed between the projector 202 and the turning mirror 206, and the projected image rays 212(a–c) pass through the quarter-wave material 204 before striking the reflective surface of the turning mirror 206. Upon passing through the quarter-wave material 204, the projected light 212(a–c) becomes circularly polarized.

The turning mirror 206 directs the projected images toward the transmission screen 208. The rays 212(f, i and l) leaving the turning mirror 206 remain circularly polarized but have a handedness opposite to that of the rays incident on the mirror 206. The departing rays are incident on the transmission screen 208. The transmission screen 208 includes a layer of quarter-wave polarizing material and a layer of polarization-dependent reflective material. Upon passing through the screen's quarter-wave material, the projected rays 212 (f, i and l) again become linearly polarized. The polarization state is such that the screen's polarization-dependent reflective material reflects this light. On the ray trace, these reflected rays 212(d, g and j) are directed from the transmission screen toward the second mirror 210.

The light reflected from the polarization-dependent reflector passes through the sheet of quarter-wave material, which circularly polarizes the light, prior to striking the second mirror 210. The second mirror 210 changes the handedness of the polarization and directs this light 212(e, h and k) back toward the transmission screen 208. At the transmission screen 208, the image again strikes the screen's layer of quarter-wave material, which linearly polarizes the light. In this instance, the polarization state is such that the screen's polarization-dependent material is transmissive, rather than reflective, and the rays are transmitted to the viewing audience.

As illustrated by the ray trace 200, the optical elements are used to create an optical folder that permits a shallower cabinet depth than in conventional rear projection systems. In a conventional system, the image rays (212 f, i and l) are incident on the transmission screen 208 at angles A, B and C. The incident angle C, measured from the normal to the transmission screen, is greater than A. As the field of view increases, the incident angle increases. Using the optical folder described above, the optical path is folded such that the incident angle for substantially all the image rays is equal to or less than a projection quality incident angle.

FIG. 2B is a polarization state diagram illustrating exemplary polarization states corresponding to the ray trace 200 of FIG. 2A. The light leaving the projector is linearly polarized, as represented by the polarization state symbol 220. The light is shown having a plane of vibration in the Y axis. This light passes through the quarter-wave material 204, which circularly polarizes the light. In the diagram, this is shown as a right-handed circular polarization state symbol 222, which indicates the polarization and handedness of the polarization. This circularly polarized light strikes the turning mirror 206, which reflects the light as left-handed circularly polarized light 224. The reflected light strikes the quarter-wave material on the transmission screen 208. This quarter-wave material linearly polarizes the light, as shown by the linear polarization state symbol 226. In this case, however, the light is polarized in a different plane of vibration 226 than the projector light 220.

The linearly polarized light is reflected by the polarization-dependent material in the transmission screen 208 and again passes through the quarter-wave material in the screen 208. The quarter-wave material circularly polarizes the light 228. The second mirror 210 reflects this circularly polarized light, changing the handedness of the polarization 230. The mirror 210 directs this light toward the screen 108 where it again strikes the quarter-wave material. The quarter-wave material linearly polarizes the light 232. The plane of vibration in this polarization state 232 is such that the polarization-dependent reflector is transmissible. The light passes through the material and the transmission screen to the person or persons viewing the screen.

In the circularly polarized system shown in FIG. 2A, the projector can be any source capable of projecting light. The mirrors 206 and 210 can be conventional mirrors, such as a mylar film mirror stretched over a metal frame, or, as will be explained hereafter, the mirrors can be dielectric mirrors. The screen 208 can be composed of multiple layers, including lenticular lens layers and Fresnel lens layers, in addition to the materials described above. The polarization-dependent layer can be a polarization-dependent reflecting film such as 3M's Dual Brightness Enhancement Film (DBEF). The quarter-wave polarization material can be any of a number of known polarizing materials or in retardation films for use in optical systems.

Figure 2C:
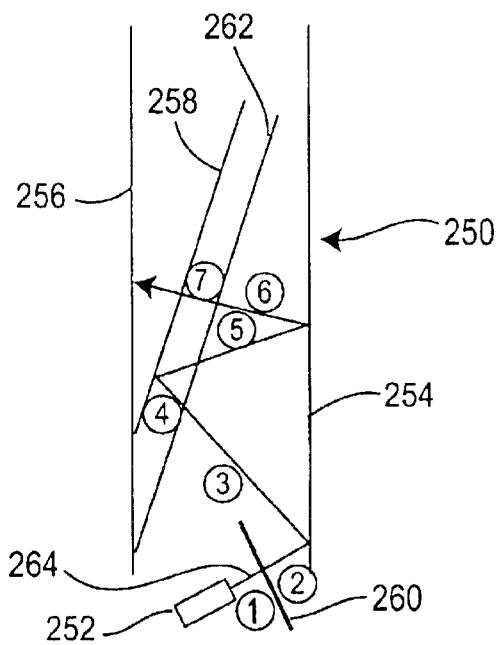

The circularly polarized system 250, for which a single exemplary ray trace is shown in FIG. 2C, is adaptable for the optical configuration used in the hand-held unit 100 shown in FIG. 1. The system 250 consists of a linear polarizing projector 252, a mirror 254, a projection screen 256, a polarization dependent reflector 258, and quarter wave sheets 260 and 262.

Figure 2D:
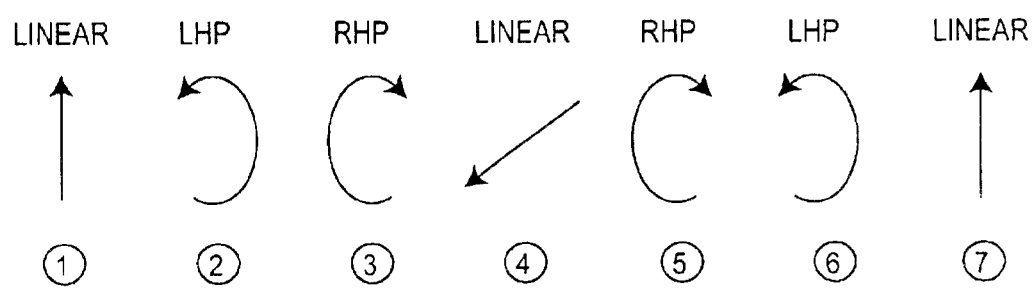

In operation, the linear polarizing projector 252 projects a linearly polarized beam 264, in a polarization state one. The beam 264 is left-handedly polarized to a polarization state two as it passes through the quarter wave sheet 260. Reflection from the mirror 254 rotates the beam 264 as right-handedly polarized in a polarization state three. Passage of the right-handedly polarized beam 264 through the quarter wave sheet 262 rotates the polarization of the beam 264 to a linearly polarized state represented as a polarization state four. The plane of vibration of the rotated beam 264 is such that the linearly polarized beam 264 reflects from the polarization dependent reflector 258. The reflection rotates the beam 264 into a right-handedly polarized beam in a polarization state five. The beam 264 transforms into a left-handedly polarized beam in a polarization state six as it reflects from the mirror 254. Passage through the quarter wave sheet 262 rotates the beam 264 into a linear polarization represented by a polarization state seven. The plane of vibration of the linearly polarized beam 264 is now oriented so that the beam 264 passes through the polarization dependent reflector 258 and onto the screen 256. FIG. 2D illustrates polarization state symbols for each of the polarization states one through seven.

Figure 3:
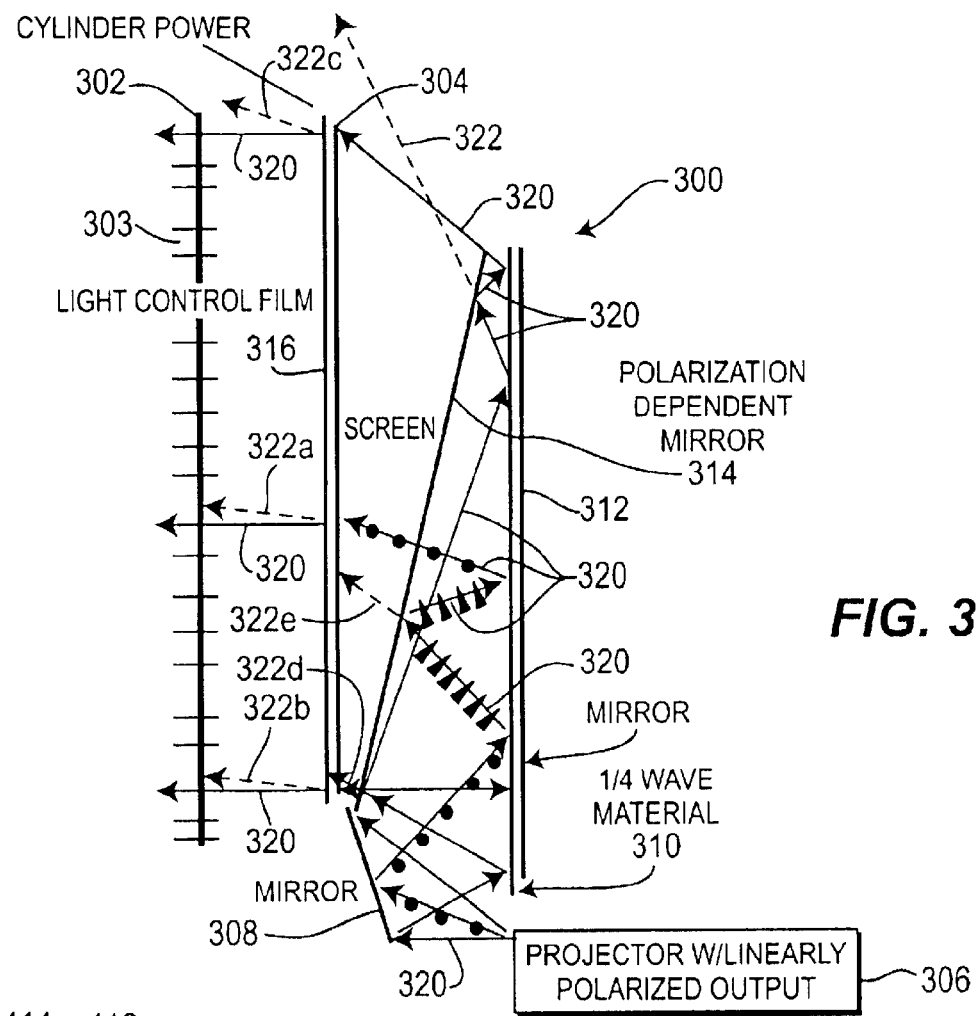
FIG. 3 shows an optical system according to the principles of the invention.

FIG. 3 shows a circularly polarized system 300 that corresponds in principle to the system 250 of FIG. 2C, and represents an implementation of the optical configuration used in the hand-held unit 100 of FIG. 1. In the circularly polarized system 300, a light control film 302 and a collimator 304 are used to reduce ghosting and scatter. As in FIG. 2C, the quarter-wave material 310 and polarization-dependent reflector 314 are not part of the screen 316, although, here, there is only one sheet of quarter-wave material 310. As in the circularly polarized systems 200 and 250, the projector 306 and mirrors 308 and 312 can be conventional mirrors or dielectric stacks. Both the projector 306 and the mirrors 308 and 312 are part of the image formation module 104 of FIG. 1. The solid 320 and broken 322 arrows indicate ray traces, where the solid arrows show the desired light travel of the system 300 and where the broken arrows indicate leakage from the polarization-dependent reflector 314 and the quarter-wave material 310. Leakage may arise because a realization of the retardation characteristics of these elements is angle and wavelength dependent.

In operation, the projector 306 outputs linearly polarized light 320, which is reflected by the turning mirror 308 toward the quarter-wave material 310 and the second mirror 312. The quarter-wave material 310 circularly polarizes the light, and the mirror 312 reflects the light toward the polarization-dependent reflector 314. The handedness of the light changes when reflected by the mirror 312, and the quarter-wave material changes the polarization state to linear. The polarization-dependent reflector 314 reflects the light back to the quarter-wave material 310 and mirror 312. As shown by broken rays 322a–e, however, some light is not reflected due to the characteristics of the polarization operative elements 310 and 314. These rays transmit to the screen 316. The reflected light 320 traverses the folding path again, and the polarization state becomes transmissive by the polarization-dependent reflector 314.

For the system 300 of FIG. 3, the light 322d–e that leaks through the polarization-dependent reflector 314 is incident at a significantly different angle than the light 320 that again traverses the folding path. A collimator 304 and light control film 302 operate to reduce the artifacts that can be caused by the mirror and quarter-wave material realization. The light control film 302 operates to absorb light incident at unwanted angles. For purposes of explanation, the film 302 is shown having slats 303 made of light-absorbing material. Light striking the slats is absorbed. The collimator 304, which can be a cylindrical lens, collimates the desired light 320 to the acceptance angle of the light control film 202. In this configuration, the light control film 202 can be interposed between one of the Fresnel lenses in the screen and a diffusing or scattering surface. Light control films of suitable characteristics are known, such as light control films manufactured by 3M Corp. Negative birefringence films also can be used to correct for phase shifts introduced by the polarization operative elements (similar to their use in LCD panels).

The quarter-wave material 310 in FIG. 3 can have broad angle and broad bandwidth capabilities. A broad angle film can be constructed from liquid crystal material and negative birefringent corrector films. Liquid crystals (LC) can act as birefringent agents. For example, combining LC material with binders yields an adjustable retardation material. Electric fields are used to cure the binders, fixing the LC's molecular orientation and, therefore, the material's retardation. The binder can be an ultraviolet light curable polymer. Negative birefringent corrector films, such as those used in LCD displays, can be combined with the LC retardation film to make the film broad angle.

The retardation characteristic of LC material is a function of the angle of incidence. In the fold system of FIG. 3, the angle of incidence on the quarter-wave material 310 is a function of position; however, in small regions the angle of incidence to the quarter-wave material 310 varies only slightly. The retardance characteristic of the LC material can be tailored point by point for the mean of local angles of incidence. This sets the retardance characteristic for a specific center wavelength and a range of angles about the local mean for the incident light. The LC material characteristic for light reflected from the mirror 312 can be calculated for a separate sheet prepared in the same manner. The retardance characteristic of the incident film is then adjusted to account for the effect of the second film by subtracting the contribution of the second film for light incident at the angle of reflection. The retardance of the second film is likewise adjusted by subtracting the contribution of the first film for light incident at the angle of incidence. The sheets can be laminated to form a "bi-film" optimized for the local range of angles.

The "bi-film" can be effectively bonded to the second mirror 312 in the system 300 of FIG. 3. To implement the "bi-film" with a dielectric mirror, the film is optimized for some wavelength, such as blue light. The film can then be bonded to a mirror produced using Giant Birefringent Optics (GBO) reflective in the blue region but transmissive in the red and green. Two additional "bi-film" layers are then prepared with retardance adjusted for the green band and red band respectively, with appropriate backing mirrors reflective in the proper wavelength. The result is a dielectric stack that implements appropriate retardance and reflection characteristics for the desired wavelengths of light and for the range of angles in the optical system.

Figure 4:
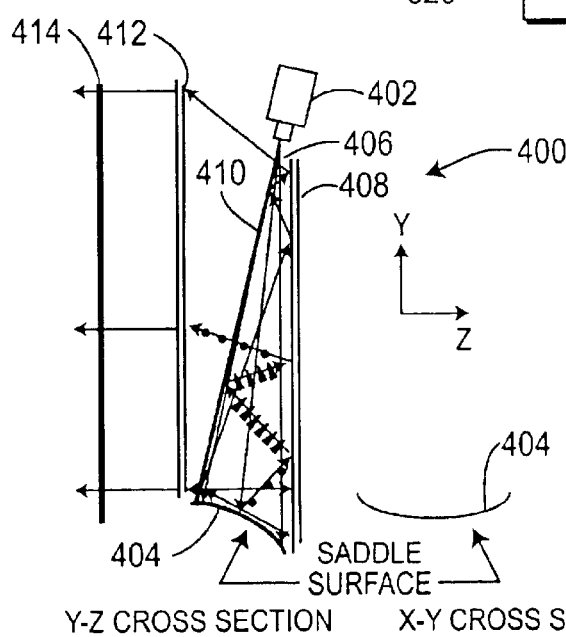
FIG. 4 shows a scanning system according to the principles of the invention.

A saddle surface, collimating scanning system 400 according to the principles of the invention is shown in FIG. 4. The system is shown in a Y-Z cross-section for ease of explanation. The point source scanning projector 402 is shown projecting toward a mirror 404. Both the projector 402 and the mirror 404 are part of the image formation module 104 of FIG. 1. The mirror 404 collimates the point source beamlets so that the light striking and reflecting off the mirror 404 projects properly upon the X and Y directions of the birefringent material. The light is incident on the quarter-wave retardation plate 406 and a second mirror 408. Light reflected from the second mirror 408 is directed to the polarization-dependent reflector 410 for eventual transmission by the screen 412. As in previously described embodiments, the screen can include a collimator for aligning desired light with a light control film 414. The mirror 408 is produced using GBO, as described with reference to FIG. 3, which causes the polarization directions of a ray propagating toward a point on the quarter-wave material 406 having non-zero X and Y coordinates to change.

In the saddle surface, collimating scanning system 400 of FIG. 4, the collimating element is the mirror 404, which has a saddle surface. The saddle surface accomplishes two goals. It collimates light to optimally orient the polarization to minimize leakage through the system's birefringent elements. It also implements a second cylindrical power that increases the effective field of the scan. For example, given a fifteen degree divergence from the source to the mirror 404, the second cylindrical power provides an effective 30 degree divergence angle, thereby increasing the vertical scan dimension. The same result is achievable with two cylindrical elements (mirrors or lenses), rather than one saddle shaped element. The magnification for these elements can be in one or two directions and need not be the same in both directions.

A cylindrical optic, collimating scanning system 500, shown in FIG. 5, serves as an alternative scanning system. In the system 500, which is included within the image formation module 104 of FIG. 1, light from a projector 503 reflects off a scanning mirror 502 onto a collimating optical element 510. The light incident on the scanning mirror 502 is polarized in the Y and Z directions as indicated by the polarization state symbol 504. The reflected ray diverges into a beam represented by multiple rays 506a–d, as would be analogous to the divergence of a point source projection. The polarization of the scanned beam is represented for a typical ray 506c by a polarization state symbol 508. The rays strike the collimating optical element 510 that collimates the light 512a–d, resulting in effective line source projection. The polarization state of the collimated light 512a–d is shown by the polarization state symbol 514 for a typical ray 512c. The collimator optimally orients the polarization to minimize leakage through the system's birefringent elements. A separate, orthogonal, cylindrical-powered scanner 501 reflects the line source projection, to create a two-dimensional scan having an effective field.

In operation, and referring back to FIG. 1, image information in the image information memory 106 is conveyed along the bus 108 to the image formation module 104. Based on the information read, the image formation module 104 projects a linearly polarized light beam 130 that is incident on the projection sheet 118, and specifically on the second sheet 122. The second sheet 122 reflects the beam 130 to the first sheet 120. The first sheet 120 reflects the beam 130 based on the current polarization state of the light. The second sheet 112 again reflects the beam 130. The beam 130 now has a polarization state that allows it to pass through the first sheet 120 and onto the third sheet 124, which serves as a viewing screen.

FIG. 6 demonstrates how a linearly polarized beam 130, required for the folded optics, can be produced from an unpolarized beam. A linear polarizing scanner 600, which is included within the image formation module 104, includes a laser 606 driven by a video signal drive 604 connected to a signal monitor 602. Use of a signal monitor in a feedback scheme is discussed later. The image formation module 600 further includes a focusing lens 610, a polarizing cube 612, a half-wave plate 614, a biprism 620 and a line scanning mirror 622. The laser 606 outputs a laser beam 608. The focusing lens 610 collimates the beam 608 to make it nearly circular in cross-section. The focusing lens 610 also gives the beam 608 a cone angle that will cause the beam 608 to focus at the screen. This slowly-converging beam 608 passes into a polarizing cube 612 that splits it into two beams having orthogonal polarization states. One of the two beams, an orthogonally polarized beam 616, passes through the polarizing cube 612. The other of the two beams, an orthogonally polarized beam 618, reflects from a half-wave plate 614, and is thereby converted to the same polarization state of that of the orthogonally polarized beam 616. A biprism 620 toes in the beams 616 and 618 to make them meet at the viewing screen 124 after reflecting off a line scanning mirror 622, the saddle surface mirror 404 and the first 120 and second 122 sheets of the projection sheet 118. For color implementation, the image formation module 600 can include three lasers, such as a red, a green and a blue one. By tilting the mirrors with slightly different tilt angles, or by using a triprism, each of the three lasers can be toed in to meet at the screen 124.

The blank retrace on each scan results in a duty cycle of approximately 50%, even if alternate frames are traced in reverse order, i.e., top to bottom, then bottom to top, etc. Higher resolution at the viewing screen may require faster writing. U.S. Pat. No. 5,629,790 to Neukermans et al. is directed to micro scanning mirrors for use in a display. Neukermans discloses a reciprocating scanning mirror embodiment that cancels overall torque, thereby reducing vibration and the need for a weighty scanner to absorb the vibration. The disclosure is limited to two scanning mirrors, and corresponding beams. Although two beams write faster than one, more writing speed can achieve higher resolution at the viewing screen.

A multi mirror-pair, torque-canceling, scanning configuration 700, shown in FIG. 7, provides a light-weight scanner that writes at high speed, by reciprocating mirror motions in each pair of mirrors while maintaining a temporal phase relationship among all the mirrors. The configuration 700 includes an outer gimbal 702, an inner gimbal 704, and scanning mirrors 706, 708, 710 and 712. Horizontal torsion bars 714 axially and rotatably connect the inner gimbal 704 to the outer gimbal 702. Vertical torsion bars 716 axially and rotatably connect the mirror 706 to the inner gimbal 704. Also axially and rotatably connected to the inner gimbal 704 are mirrors 708, 710 and 712 by vertical torsion bars 718, 720 and 722, respectively. The image formation module 104 includes, in addition to the configuration 700, one source of modulated laser light directed at each of the mirrors 706, 708, 710 and 712 and either the saddle surface mirror 404 or the scanner 501, mirror 502 and element 510.

In operation, a central stripe electrode 726 attracts inner portions of the mirrors 706 and 708, while the outer stripe electrodes 724 and 728 repel outer portions of the mirrors 706 and 708. This causes the mirrors 706 and 708 to turn inward. The central electrode 726 and the outer electrodes 724 and 728 alternates repel and attract to turn the mirrors 706 and 708 alternately inward and outward. Similar reciprocal motion occurs with the mirrors 710 and 712 in response to attraction and repulsion by a central stripe electrode 732 and the outer stripe electrodes 730 and 734. Modulated laser light reflecting from the mirrors 706, 708, 710 and 712 subsequently reflects from the saddle shape mirror 404 and through the folded optics, ultimately arriving at the viewing screen 124.

Figure 8A:
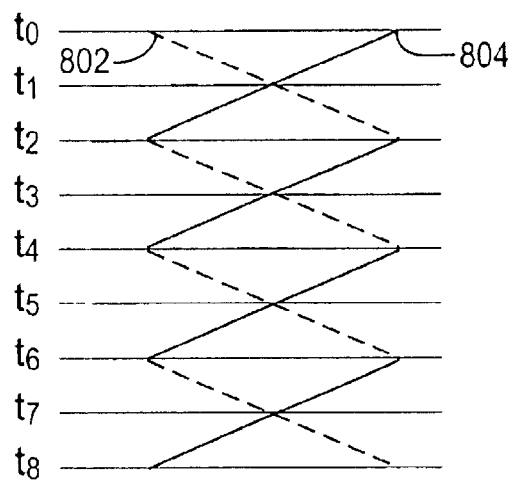
FIGS. 8A–D illustrates scanning traces, a nd a phase diagram, for the embodiment of FIG. 7.

FIG. 8A is a timing diagram of the scanning of mirrors 706 and 708 that demonstrates their operation. A trace 802 represents the scanning of the mirror 706, and a trace 804 represents the scanning of the mirror 708. During the time period between t0 and t2, the scanner directed at the mirror 706 performs a blank retrace. In the same period, the scanner directed at the mirror 708 writes a scanline screen image on a viewing screen (not shown). During the time period between t2 and t4, the scanner directed at the mirror 706 writes a scanline screen image, while the scanner directed at the mirror 708 performs a blank retrace. Each scanner thus proceeds through repeated cycles, each consisting of a writing phase followed by a blank retrace phase. The mirrors 706 and 708 are 180 degrees out-of-phase in writing scanline screen images.

Figure 8B:
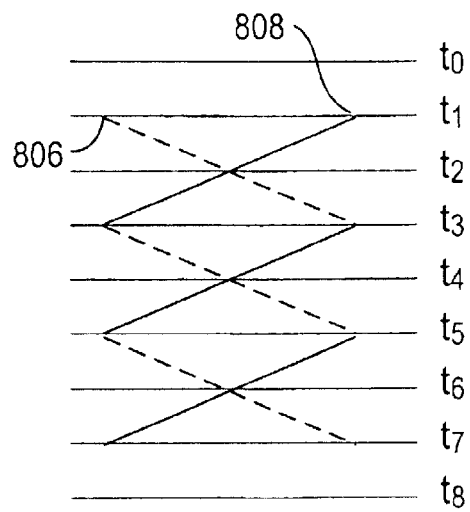

FIG. 8B shows the scan timing for the mirrors 710 and 712. Specifically, a trace 806 represents the scanning of mirror 710, and a trace 808 represents the scanning of mirror 712. The scan timing for the mirrors 710 and 712 reciprocates, as shown above for the mirrors 706 and 708. Also, the scan timing for mirrors 710 and 712 is delayed by one time period with respect to the scan timing for mirrors 706 and 708. For example, the scanner directed at the mirror 712 begins scanning at time t1 halfway through the scan of the scanner directed at the mirror 708.

Figure 8C:
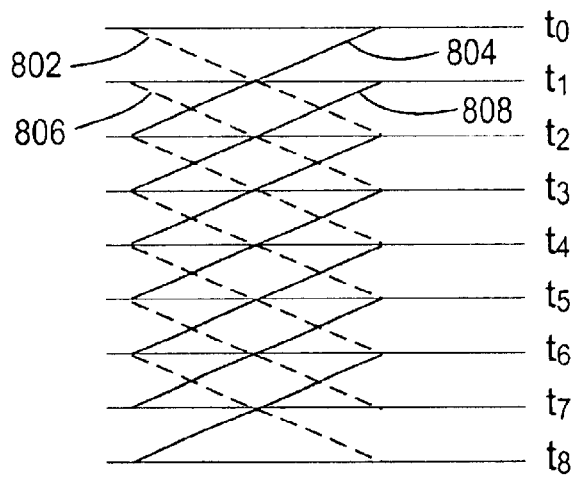
Figure 8D:
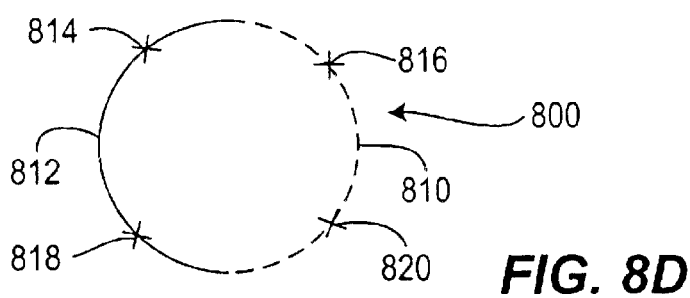

FIG. 8C provides a composite timing diagram 800 of the scanning in FIG. 7. The resulting scanline screen images are generally parallel and evenly spaced. FIG. 8D shows a cycle of scanning for a laser, with a broken line 810 representing blank retrace and a solid line 812 representing scanline screen image formation. At the time halfway between t2 and t3, the trace 808 has created ¼ of the current scanline screen image. A phase 814 of the trace 808 is therefore halfway between two hundred seventy and three hundred sixty degrees, or three hundred fifteen degrees. By similar logic, a phase 816 of the trace 804 is forty five degrees. Similarly, a phase 818 of the trace 802 is two hundred twenty five degrees, and a phase 820 of the trace 806 is one hundred thirty five degrees. The four phases 814, 816, 818 and 820 reside at four respective equidistant phase locations on the cycle, i.e., the four phases are ninety degrees out-of-phase. At any point of time, this temporal phase relationship is maintained, delivering generally parallel and equally spaced scanline screen images. Although two pairs of reciprocating mirrors are shown, more than two pairs can be implemented for even higher writing speeds.

Figure 9:
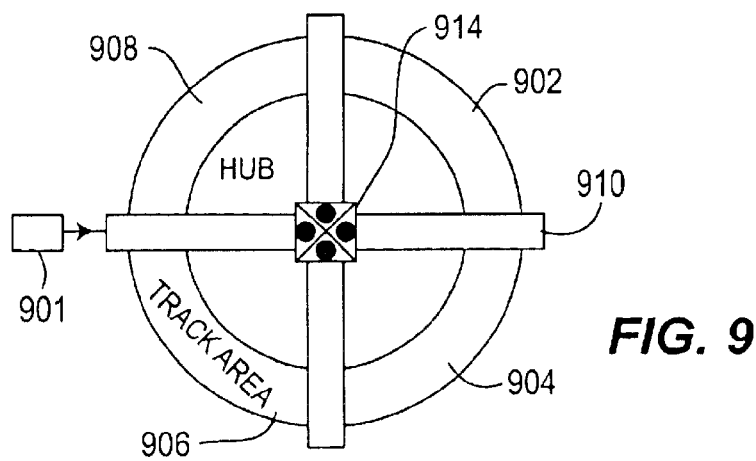
FIG. 9 illustrates a scanner according to the principles of the invention.

An alternative scanner is an electro-optical holographic scanner 900 as shown in FIG. 9. The electro-optical holographic scanner 900 includes a disk 902, and a plurality of radially-situated electro-optical (E-O) readers 910 responsive to a corresponding number of sources of modulated laser light sources 901. The disk 902 includes a hub 904 that is surrounded by a track area 906 with a number of concentric tracks 908. The plurality of readers 910 radially override and traverse the disk 902 to meet at the center. For simplicity of demonstration, four readers are shown, although practical considerations of writing speed and size may require more readers. In general, if there are n readers 910, there are n+1 tracks 908, as will be explained below. Each concentric track 908 contains a plurality of spaced holographic gratings 912. Each holographic grating 912 is a reflective hologram that focuses and directs light to the viewing screen 124. Light from the modulated light source 901 enters its corresponding reader 910. The reader 910 reflects the light so that the light diffracts through the holographic grating 912. The reader 910 then outputs the light through a light exit port 914 to a part of the viewing screen 124 at which the holographic grating 912 aims.

Figure 10:
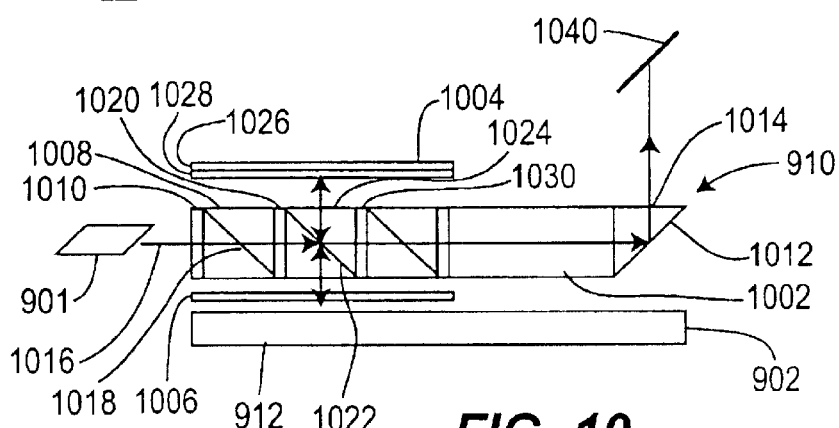
FIG. 10 shows details of a reader used in the scanner of FIG. 9.

FIG. 10 shows an exemplary E-O reader 910 for use in the E-O holographic scanner 900 of FIG. 9. An E-O reader 910 includes a polarizing tracker 1002 interposed between a polarization rotating reflector 1004 and a polarization rotating sheet 1006. The polarizing tracker 1002 includes a polarizing cube 1008 for each track 908. The polarizing cubes 1008 are sandwiched between electro-optical (E-O) cells 1010. At the central end of the polarizing tracker is a turning mirror 1012 and a light exit port 1014.

At any given time, a given reader 910 will be assigned to a particular track 908. The reader 910 needs to be able to switch tracks quickly as the track area 906 rotates. The E-O cells 1010 that sandwich a corresponding polarizing cube 1008 are electrically switchable between two states. A first state preserves the polarization of light that passes through. A second state rotates the polarization, such as from P (parallel) to S (perpendicular) or from S to P. By electrically adjusting the states of the E-O cells that sandwich a polarizing cube 1008, the track 908 corresponding to the cube 1008 is instantly assigned to the reader 910.

To demonstrate, it is assumed that the modulated light source 901, shown in FIG. 10, projects a P polarized laser beam 1016. The E-O cell 1010 is set to preserve the P polarization. Thus, the beam 1016 passing into the polarizing cube 1008 remains P polarized when incident upon a prism facet 1018 in the polarizing cube 1008. The prism 1018 facet passes P polarized light. Therefore, the beam 1016 passes to the E-O cell 1020. The E-O cell 1020 is set to rotate the polarization to S. A prism facet 1022 of a polarizing cube 1024 does not pass, but reflects, the beam 1016, because the beam 1016 now has an S polarization. The reflected beam 1016 passes through the polarization rotating sheet 1006, which is implemented as a quarter-wave sheet. The beam 1016 is then diffracted by the holographic grating 912 at some angle and passes back to the polarizing cube 1024. Since the two passes through the quarter-wave sheet 1006 have rotated the light back to P, the beam 1016 passes through the prism facet 1022. The beam 1016 continues on to the polarization rotating reflector 1004, which consists of a mirror layer 1026 and a polarization rotating layer 1028. The beam 1016 passes through the layer 1028, which is implemented as a quarter-wave sheet, and returns to the polarizing cube 1024. As it passes through the quarter-wave sheet 1028 on its return its polarization is again made to be S. The S-polarized beam deflects off the prism facet 1022 and toward the turning mirror 1012. Upon encountering the following E-O cell 1030 the polarization of the beam 1016 is once again converted to P. Thus, it is thus allowed to propagate to the turning mirror 1012, which reflects the beam 1016 out the light exit port 1014. The beam 1016 is reflected by an orthogonal scanner 1040 toward the projection sheet 118.

Figure 11A:
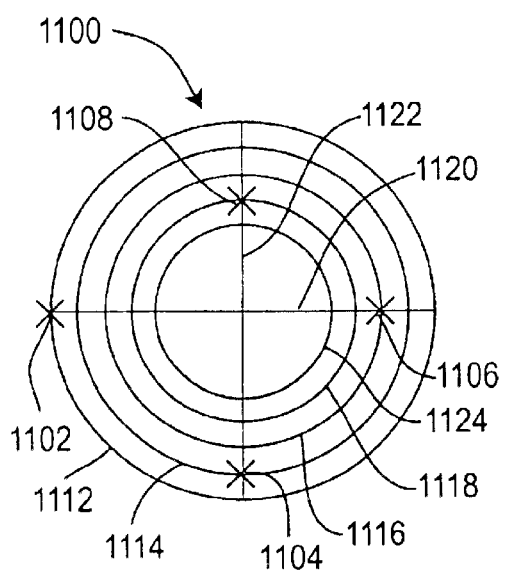
FIGS. 11A and 11B show a positioning diagram and a scanline timing diagram, respectively, for the reader of FIG. 10.

Illustrated in FIG. 11A is a reader assignment scheme 1100 to demonstrate the operation of the readers 910. The holographic gratings 1102, 1104, 1106 and 1108 in the respective tracks 1112, 1114, 1116 and 1118 denote where four respective readers 910 are reading at a given point of time. The gratings 1102 and 1106 lie on an axis 1120, and the gratings 1104 and 1108 lie on an axis 1122. Therefore, two of the four readers lie on the axis 1120 and the other two readers lie on the axis 1122. As the track area 906 revolves, the four readers shift tracks to arrive at positions along their respective axes. The readers shift tracks inward in unison at the completion of each revolution of the track area 906, except that shifting from the inner track 1124 occurs to the outer track 1112. Thus, in a five-track configuration, five revolutions complete a cycle. In each cycle, a scanline screen image 302 is written to the viewing screen 124 based on the readings of a respective reader 910. The turning mirrors 1012 of the four readers 910 are positioned in four different respective orientations, i.e., tilted slightly differently, to create four corresponding scanline screen images 302. The cycles of the respective readers are out-of-phase by 90 degrees. The temporal phase relationship among the readers is maintained as the track area 906 revolves.

Figure 11B:
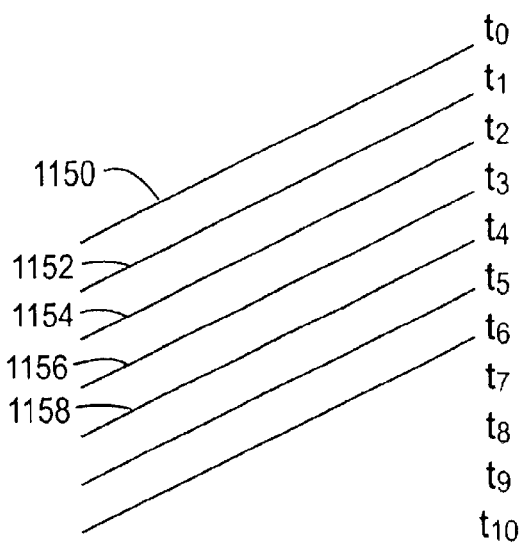

FIG. 11B is a timing diagram for scanline screen images 1150, 1152, 1154, 1156 and 1158. At a time t4, the reader reading the grating 1102 is beginning the scanline screen image 1158, and has just switched tracks after having completed the scanline screen image 1150. The reader reading the grating 1108 has completed ¾ of the scanline screen image 1152. The reader reading the grating 1106 has completed ½ of the scanline screen image 1154. Finally, the reader reading the grating 1104 has completed ¼ of the scanline screen image 1156. The state of scanline screen image completions are therefore 90 degrees out-of-phase. The temporal phase relationship of scanline screen image completions corresponds to the temporal phase relationship among the readers, and these relationships remain constant as the track area 906 revolves.

To yield high-resolution images requires that a scanline screen image of 2000 screen dots, corresponding to 2000 holographic gratings, be drawn in about 20 microseconds. This is the equivalent of tracing through a two meter track of holographic gratings at an effective linear rate of 95 kM/sec, which is unacceptable. A circle two meters in circumference has a diameter of 0.64 meters. A ten track system, with nine readers, reduces the size of the circular track to 64 mm or about 2.5 inches, and provides high writing speed. Moreover, no blank retrace exists, and thus there is no negative impact on the duty cycle caused by the reset time of a scanning mechanism.

Figure 12A:
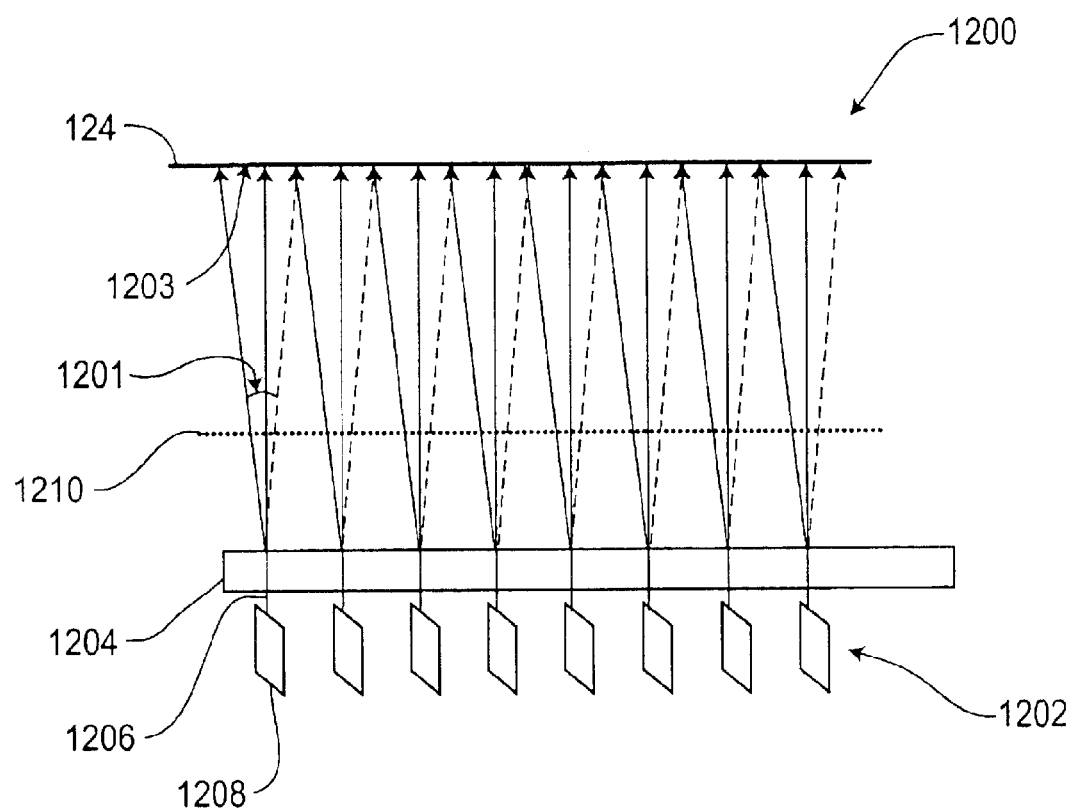
FIGS. 12A and 12B show a side-view of a scanner and a top view of a holographic disk of the scanner, respectively, according to the principles of the invention.

Another alternative scanner is a tiling, holographic scanner 1200, shown conceptually in FIG. 12A. A tiling, holographic scanner 1200 includes a laser array 1202 and a disk 1204 (shown in cross-section). A laser beam 1206 from a laser 1208 is reflected by an orthogonal scanner to a viewing screen. The laser beam 1206 traverses an angular range 1201 to create a scanline screen image segment 1203 on the viewing screen 124.

Figure 12B:
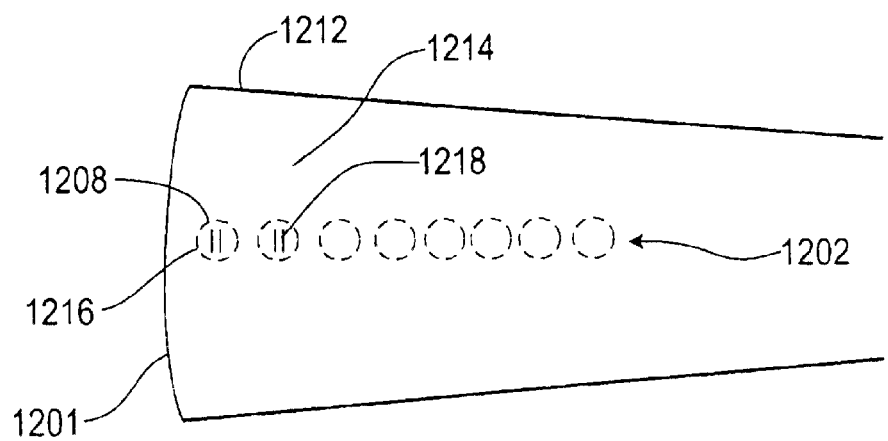

FIG. 12B shows a top view of a section 1201 of the disk 1204. The disk 1204 has a plurality of concentric tracks. Shown are two tracks, 1212 and 1214. Each contains a plurality of holographic gratings implemented as transmitting holograms. For example, a grating 1216 resides in the track 1212, and a grating 1218 resides in the track 1214. In FIG. 12B, the lasers 1208 of the laser array 1202 are represented by broken lines. In the present implementation, each concentric track has 200 spaced holographic gratings.

In operation, with each revolution of the disk 1204, each laser 1208 creates in unison, by reflection from the orthogonal scanner 1204, a scanline screen image segment 1203, so that the scanline screen image segments 1203 collectively form a scanline screen image. The orthogonal scanner 1204 forms the scanline screen images so that they are generally equally spaced and parallel. As in the previous embodiment, no blank retrace exists.

The lasers are generally spaced apart by a distance approximately equal to the length of a scanline screen image segment, but this need not be a restriction. Overlap and feathering of the scanline screen image segments 1203 can be employed to improve the images. A longer viewing screen can be covered by tiling together more lasers to form a two-dimensional array of lasers. This tiling approach is also amenable to mirror implementation.

Figures 13, 14:
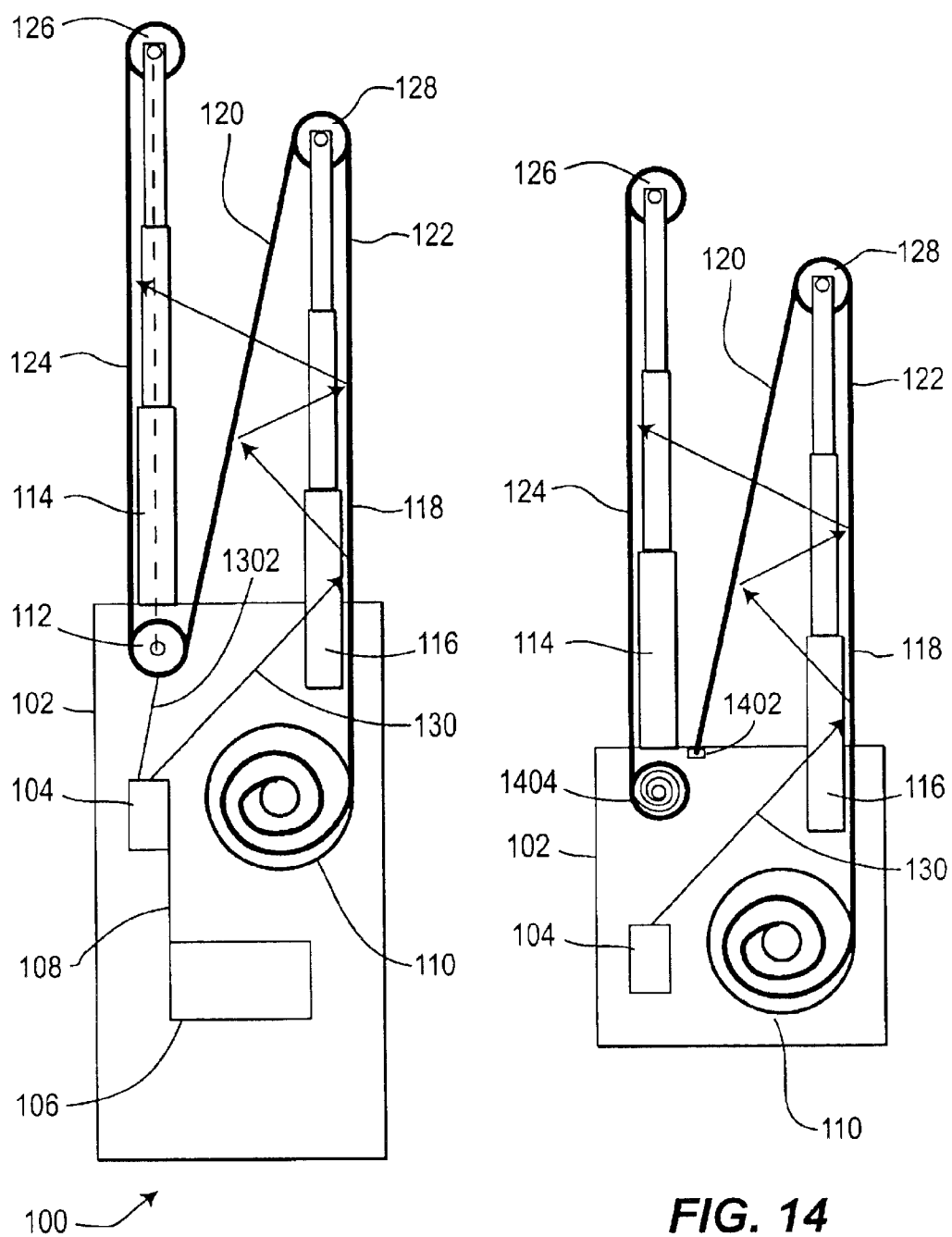
FIG. 13 shows a side view of an embodiment of a retractable screen according to the principles of the invention.
FIG. 14 shows a side view of an embodiment of a retractable screen system according to the principles of the invention.

FIG. 13 illustrates a hand-held unit with a beam index screen. A bus 1302 attaches to the beam index screen 124, and extends through the front pulley 126, down an arm of the front telescoping arm pair 114 and into the image formation module 104. The retractable nature of the projection sheet 118 requires that precise alignment be available, when, for example, the unit is employed for command and control or military applications. For instance, for a colored viewing screen, red, blue and green phosphors may be employed. Fresnel elements on one side of the screen allow the incoming beam to impinge normally on the phosphors. Included in the phosphor layer would be black matrix areas or indexing stripes. Black matrix areas could be amorphous silicon solar cell material. When a beam 130 arrives at the beam index screen 124 and strikes, for example, an indexing stripe, a feedback signal is sent along bus 1302 to the image formation module 104. Based on this feedback signal, the image formation module 104 aligns the beam 130. Retraction of the front telescoping arm pair 114 allows the bus 1302 to collect slackly within the housing 102.

FIG. 14 shows another embodiment of a hand-held unit with a retractable screen. This embodiment differs from the hand-held unit 100 in FIG. 1 in that the projection sheet 118 is anchored not at the front pulley 126, but at anchor 1402. In addition, a take-up roller 1404 is substituted for the internal pulley 112. Retraction of the front telescoping arm pair 114 causes the viewing screen 124 to roll up on the take-up roller 1404.

A retractable screen, in accordance with the principles of the invention, can be made for units that are larger than hand-held devices. One application is roll away systems for both the home and commercial situations. The screen can roll away into a base such as a rear projection TV or a ceiling mount for home or military or electronic cinema applications. Thus, a large screen TV can be made both transportable and non-invasive upon living space, when not in use. In home theater applications, as in the other large image applications, a conventional image projector can be used as well as a scanner.

The foregoing descriptions are exemplary only, and are not intended to limit the scope of the invention. Modifications to these exemplary embodiments and substitutions for components in the exemplary embodiments may be apparent to one having ordinary skill in the art.

What is claimed is:

1. A rear projection system comprising:
   a retractable rear-projection screen retractable from a deployed position to a stowed position;
   a projector that projects light onto the retractable rear-projection screen; and
   a folded light path between the projector and the screen;
   wherein the projector projects light that is polarized to fold a path of the light to the screen, to thereby form the folded light path.

2. The system of claim 1, wherein the retractable rear-projection screen is folded into a first sheet, a second sheet and a third sheet when the screen is extended, the first sheet, second sheet and third sheet being continuous.

3. The system of claim 1, further comprising a continuous sheet retractable into and extendable from the base, the continuous sheet being folded into a first and second section to be operable with the retractable rear-projection screen when the retractable rear-projection screen is extended.

4. The system of claim 1, wherein the retractable rear-projection screen includes a viewing screen, a first sheet and a second sheet, the viewing screen being disposed for retraction into the base and for extension from the base, the viewing screen being further disposed, when extended, to receive the light, at least some of the light having been selectively reflected back and forth between the first sheet and the second sheet.

5. An apparatus for projecting light to a viewing screen, the apparatus comprising:
   a base;
   a projector for projecting light;
   a viewing screen connected to the base, the viewing screen having light-detecting portions that provide to the projector feedback based on the projected light; and
   a roller connected to the base, for rolling and unrolling the screen.

6. The apparatus of claim 5, wherein the screen includes a first sheet that selectively transmits and reflects the projected light based on a polarization state of the projected light.

7. An apparatus comprising:
   a base;
   a viewing screen retractably connected to the base;
   a projector for projecting light to the viewing screen;
   a first sheet, connected to the base, the first sheet selectively transmitting and reflecting the projected light based on a polarization state of the projected light; and
   a roller, connected to the base, operable to roll and unroll the first sheet.

8. The apparatus of claim 7, further comprising a second sheet, that reflects the projected light, the roller further operable to roll and unroll the second sheet.

9. The apparatus of claim 8, wherein the viewing screen has light-detecting portions that automatically provide the projector feedback based on the projected light.

10. The apparatus of claim 8, wherein the roller is operable to roll and unroll the viewing screen.

11. A portable, hand-held unit with retractable displaying facilities, the unit comprising:
    an image information memory within the unit;
    a rear-projection viewing screen extendible from and retractable into the unit;
    an image formation module in communicative connection with the image information memory and the viewing screen; and
    means for extending and retracting the viewing screen;
    wherein the viewing screen extends so that a first sheet is interposed between the viewing screen and a second sheet, the first sheet selectively transmitting and reflecting light from the image formation module, the second sheet reflecting the light from the image formation module.

12. The unit of claim 11, further comprising a projection sheet that includes the rear-projection viewing screen, the projection sheet being folded into a plurality of sections when the rear-projection viewing screen is extended.

13. The unit of claim 11, wherein the extending and retracting means includes a roller, and wherein the viewing screen, first sheet and second sheet are continuously connected to form a projection sheet that rolls onto the roller to retract the viewing screen and unrolls from the roller to extend the viewing screen.

14. A method of selectively providing facilities to rear-project light, the method comprising the steps of:
    disposing both a first sheet and a second sheet for retraction into a base and extension from the base;
    further disposing the first sheet and second sheet to reflect light back and forth to each other when the first sheet and the second sheet are extended; and
    selectively reflecting light from, and transmitting light through, the first sheet to a viewing screen.

15. A method of selectively providing facilities to rear-project light, the method comprising the steps of:
    establishing indexing portion on a viewing screen;
    providing a base with means for rolling and unrolling the viewing screen; and
    projecting light to at least some of the indexing portions;
    providing an image formation module for modulating the projection of the light; and
    routing feedback from the at least some indexing portions to the image formation module.

16. A method of selectively providing facilities to rear-project light, the method comprising the steps of:
    providing a base with means for rolling and unrolling a viewing screen;
    projecting light; and
    selectively transmitting and reflecting the projected light based on a polarization state of the projected light, the transmitted light being transmitted to the viewing screen.

17. A rear projection system comprising:
    a housing;
    a screen extendable from and retractable into the housing;
    a projector located within the housing operable to project onto the screen; and
    a folded light path between the projector and the screen;
    wherein the projector projects light that is polarized to fold a path of the light to the screen, to thereby form the folded light path.

* * * * *